United States Patent [19]
Landeis

[11] Patent Number: 5,934,054
[45] Date of Patent: Aug. 10, 1999

[54] ROW CROP HEADER

[76] Inventor: Marvin J. Landeis, 2928 Orr Cir., Inkster, N. Dak. 58244

[21] Appl. No.: 08/912,817

[22] Filed: Aug. 19, 1997

[51] Int. Cl.[6] ............................. A01D 34/82; A01D 45/00
[52] U.S. Cl. .............................. 56/14.3; 56/14.5; 56/157; 56/327.1; 460/123; 171/DIG. 1
[58] Field of Search ..................................... 56/14.3, 14.5, 56/14.6, 121.4, 122, 157, 255, 295, 327.1, 327.2, 328.1, 1; 460/123, 131, 904; 171/DIG. 1

[56] References Cited

U.S. PATENT DOCUMENTS

| | | | |
|---|---|---|---|
| 3,665,686 | 5/1972 | Duncan | 56/14.5 X |
| 3,921,375 | 11/1975 | Cetrulo, Jr. | 56/327.1 |
| 3,921,723 | 11/1975 | Seem | 56/327.1 X |
| 4,009,557 | 3/1977 | Reicks | 56/14.3 X |
| 4,694,641 | 9/1987 | Porter | 56/327.1 X |

*Primary Examiner*—Terry Lee Melius
*Attorney, Agent, or Firm*—Michael S. Neustel

[57] ABSTRACT

A row crop header for cutting row crops beneath the ground surface thereby increasing the percentage of brittle and bent over row crop harvested. The inventive device includes a pair of frames defining a slot therebetween, a hydraulic motor, a pair of corrugated belts, a pair of cutting discs overlapping one another, the cutting discs include a plurality of arcuate notches, a pair of capturing discs having a plurality of resilient tines and a pair of hubs. The arcuate notches in the cutting discs prevent debris such as rocks from becoming lodged in between the cutting discs while allowing the cutting discs to cut thick stalks of the row crop. The hubs rotate near a front portion of the respective pair of frames thereby elevating the pair of frames at the desired elevation for maintaining the desired penetration into the ground of the cutting discs.

16 Claims, 3 Drawing Sheets

ROW CROP HEADER

BACKGROUND OF THE INVENTION

1. Field of the Invention

The present invention relates generally to headers and more specifically it relates to a row crop header for cutting row crops, such as beans, beneath the ground surface thereby increasing the percentage of brittle and bent over row crop harvested. Edible bean plants have a vine structure with the fragile pods laying upon the ground surface between and in the rows. Conventional harvesting of edible beans requires the use of an implement having a plurality of cutting blades that sever the edible bean plant below the ground surface to insure the fragile pods remain attached to the vine. Other cutting means, such as a Flex-Head, are not as suitable because they will sever a percentage of the pods from the vine thereby reducing the overall yield of the edible bean crop. However, the conventional method of harvesting beans requires an additional three steps that lead to further loss of the fragile pods: (1) rod weeding the severed bean plants, (2) wind rowing the beans with a bean rake, and (3) actually combining the row of edible beans. Hence, there is a need for a product that will combine the above four steps into one single step to reduce the amount of mechanical handling of the fragile bean pods.

2. Description of the Prior Art

There are numerous headers and cutting devices. For example, U.S. Pat. No. 4,086,749 to Greiner et al; U.S. Pat. No. 3,455,094 to Gorham; U.S. Pat. No. 3,459,086 to Reeder, Jr.; U.S. Pat. No. 577,985 to Koegel; U.S. Pat. No. 4,329,832 to Pietschmann; Netherland Patent 8000282 to Pottinger; and U.S. Pat. No. 2,648,942 to Grant et al are all illustrative of such prior art.

Greiner et al (U.S. Pat. No. 4,086,749) discloses a row crop header comprising a plurality of row crop units pivotally mounted with respect to one another. Greiner et al further discloses a pair of rotary discs disposed within the inlet opening in an overlapping relationship to sever the crop a finite distance above the ground surface.

Gorham (U.S. Pat. No. 3,455,094) discloses a harvester with overlapping disc cutters which are self sharpening and driven at different peripheral speeds. The overlapping disc cutters sever the crop a finite distance above the ground surface.

While these devices may be suitable for the particular purpose to which they address, they are not as suitable for cutting row crops beneath the ground surface thereby increasing the percentage of brittle and bent over row crop harvested. None of the prior art teaches a header with a pair of cutting discs which penetrate the ground a finite distance. Further, none of the prior art teaches a pair of cutting discs with a plurality of arcuate notches for preventing debris such as rocks from lodging between the pair of cutting discs while operating within the ground.

With new chemicals available which cause all of the edible bean plants in a field to ripen simultaneously, straight combining of the edible bean pods is made possible. However, the conventional four step process of combining edible beans does not take advantage of the new chemicals presently available. The present invention allows straight combining of various row crops, especially edible beans, with a dramatic reduction in the amount of crop damaged or left in the field unharvested.

In these respects, the row crop header according to the present invention substantially departs from the conventional concepts and designs of the prior art, and in so doing provides an apparatus primarily developed for the purpose of cutting row crops beneath the ground surface thereby increasing the percentage of brittle and bent over row crop harvested.

SUMMARY OF THE INVENTION

A primary object of the present invention is to provide a row crop header that will overcome the shortcomings of the prior art devices.

Another object is to provide a row crop header that severs a row crop beneath the ground surface a predetermined finite distance.

Another object is to provide a row crop header which reduces the conventional four step process of harvesting beans—(1) blade cutting the beans; (2) using a rod weeder to eliminate dirt balls; (3) wind rowing the beans with a bean rake; (4) combining the beans—into a one step process thereby dramatically reducing fuel, machinery and labor costs.

An additional object is to provide a row crop header tht utilizes the ground as a buffer to reduce the shock of the cutting action to the row crop such as fragile pods or bean plants.

A further object is to provide a row crop header that utilizes a pair of rotating adjustable hubs for maintaining a desired cutting depth into the ground.

Another object is to provide a row crop header that utilizes a pair of cutting wheels having a plurality of arcuate notches for preventing lodging of debris such as rocks or sticks.

Another object of the present invention is to provide a row crop header which allows the user to harvest edible beans up to two mph faster than when combining wind-rows which are twisted from the bean rake.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
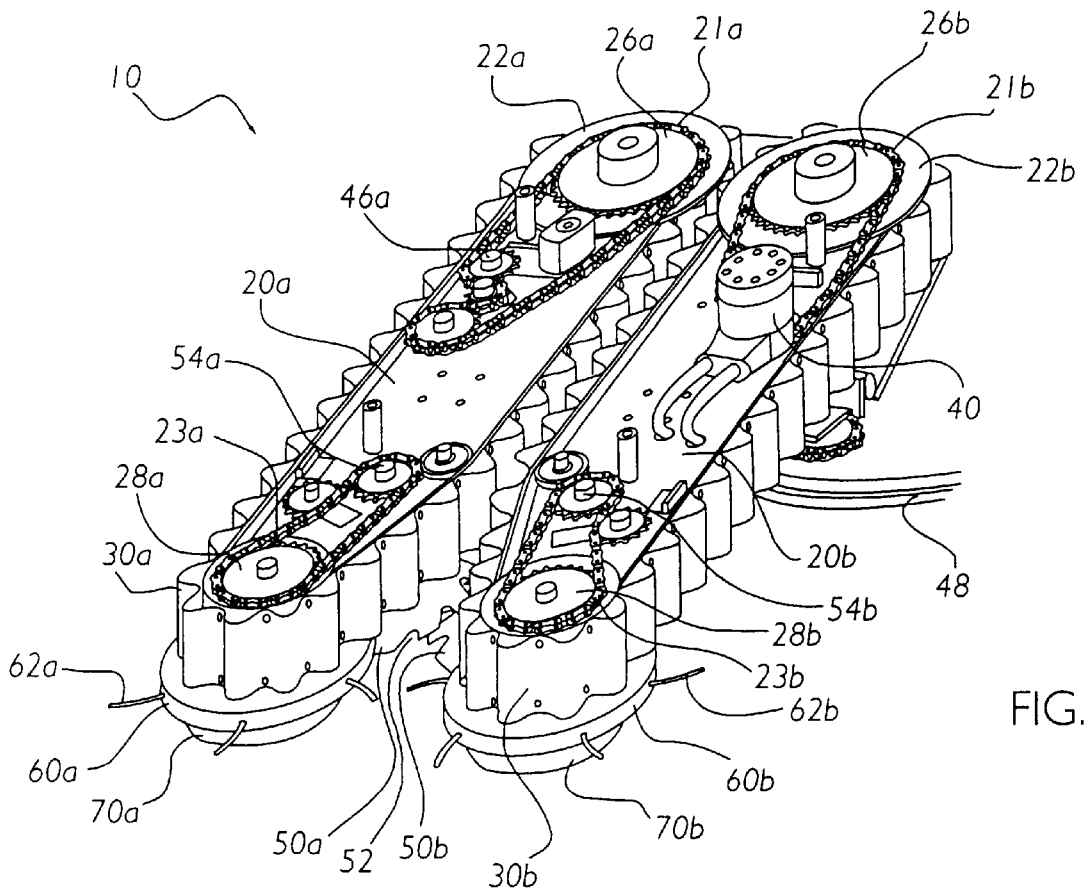
FIG. 1 is an upper perspective view of the present invention.
Figure 2:
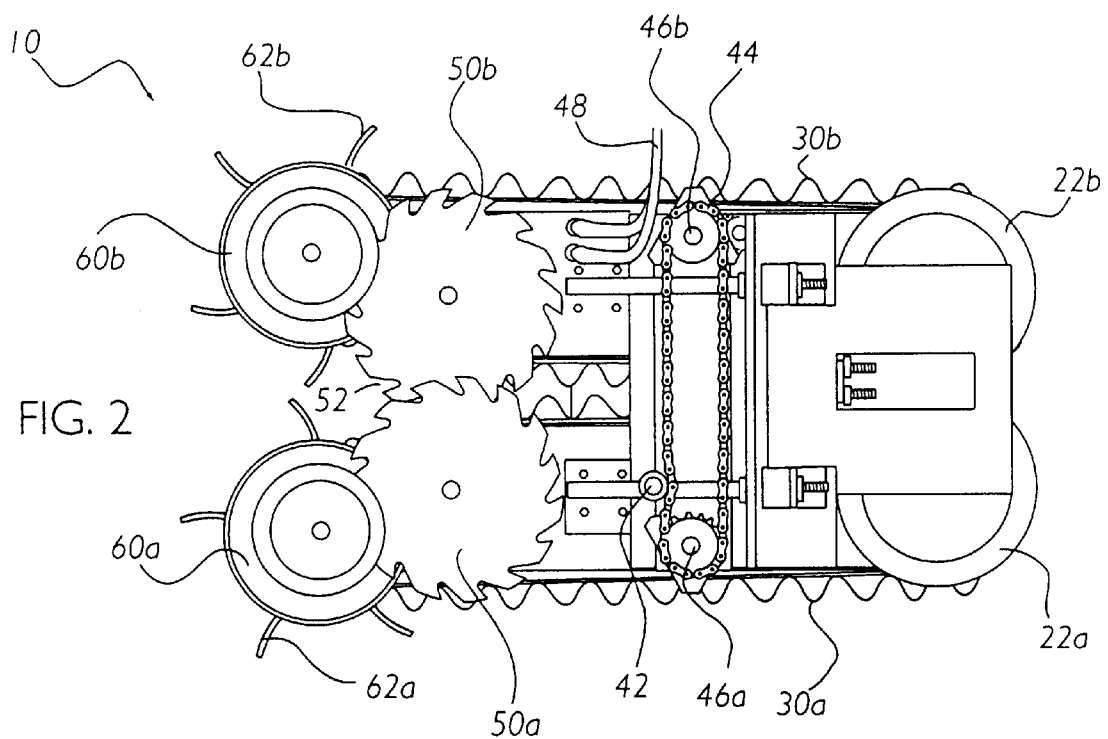
FIG. 2 is a bottom view of the present invention.
Figure 3:
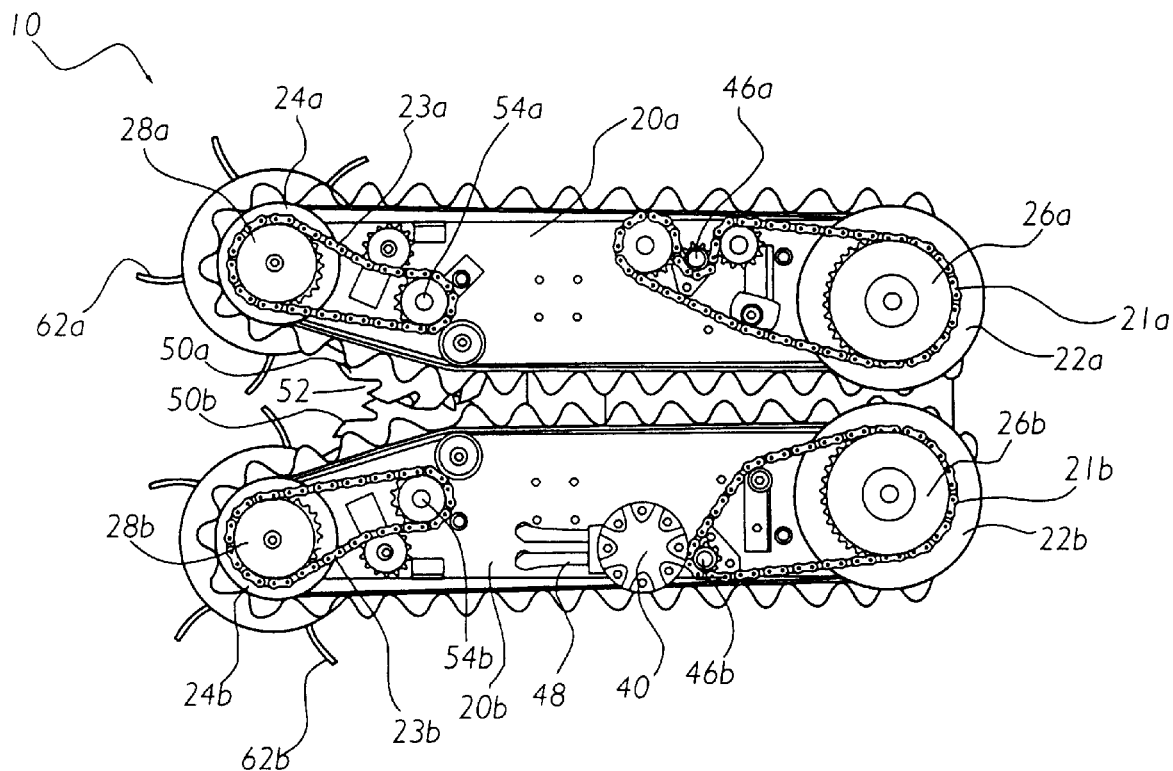
FIG. 3 is a top view of the present invention.

Turning now descriptively to the drawings, in which similar reference characters denote similar elements throughout the several view, FIGS. 1 through 5 illustrate a row crop header 10, which comprises a pair of frames 20a–b defining an unnumbered slot therebetween, a hydraulic motor 40, a pair of corrugated belts 30a–b, a pair of cutting discs 50a–b overlapping one another, the cutting discs 50a–b include a plurality of arcuate notches 52, a pair of capturing discs 60a–b having a plurality of resilient tines 62 and a pair of hubs 70a–b. The arcuate notches 52 in the cutting discs 50a–b prevent debris such as rocks from becoming lodged in between the cutting discs 50a–b while allowing the cutting discs 50a–b to severe thick stalks of a row crop. The hubs 70a–b rotate near a front portion of the respective pair of frames 20a–b thereby elevating the pair of frames 20a–b at the desired elevation for maintaining the desired penetration into the ground of the cutting discs 50a–b as best shown in FIG. 3 of the drawings.

As best shown in FIGS. 1 and 3 of the drawings, the pair of frames 20a–b are distally attached to one another by at least one unnumbered cross member. The frames 20a–b define the unnumbered slot which is broader at the front portion of the frames 20a–b for receiving the row crop 12 and tapers to a constant width for transporting the severed row crop 12 to an auger of a combine. The frames 20a–b are pivotally attached to the combine along a substantially horizontal axis by an unnumbered attaching means. The pivotal attachment of the frames 20a–b allows the front portion of the frames 20a–b to elevate or descend depending upon the physical characteristics of the field.

Figure 5:
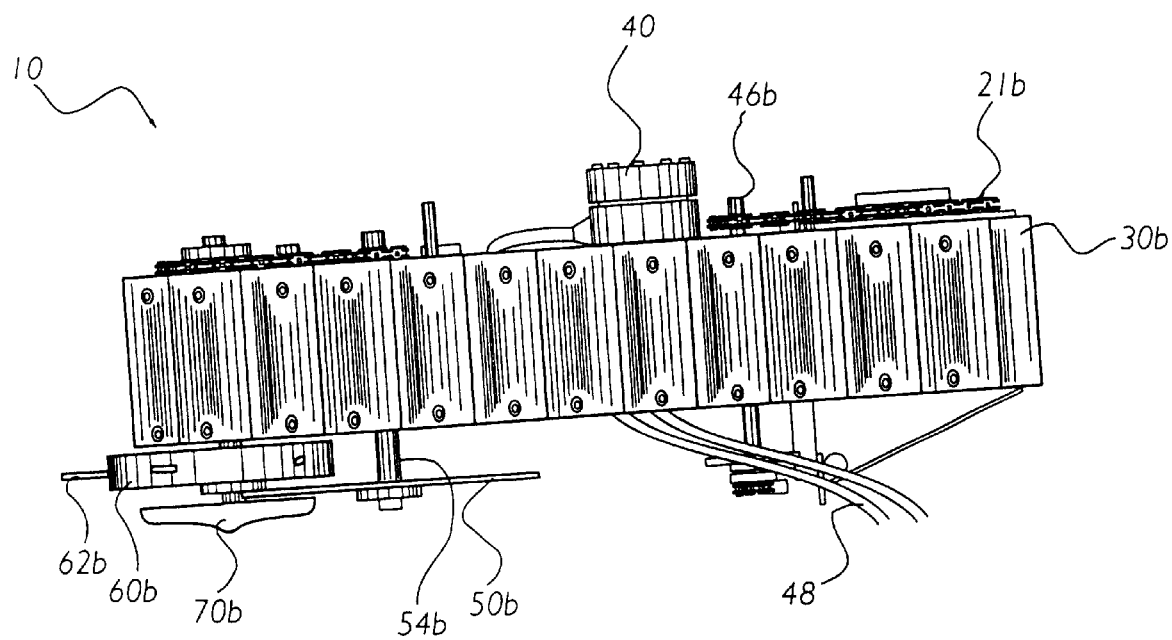
FIG. 5 is a side view of the present invention.

As shown in FIGS. 1, 3 and 5 of the drawings, the hydraulic motor 40 is attached to the frame 20b and has hydraulic hoses 48 projecting therefrom. The drive shaft 42 of the hydraulic motor 40 projects downwardly where it mechanically engages a drive chain 44 as best shown in FIG. 2 of the drawings. The drive chain 44 mechanically connects a pair of vertical shafts 46a–b so as to rotate the pair of vertical shafts 46a–b simultaneously. The vertical shafts 46a–b rotatably project through the respective frames 20a–b along a substantially vertical axis.

As best shown in FIG. 3 of the drawings, an upper end of the vertical shafts 46a–b opposite of the drive chain 44 mechanically engages a rear chain 21a–b respectively. The rear chain 21a–b mechanically drives a respective rear sprocket 26 attached to a respective rear pulley 22a–b which rotates the respective corrugated belt 30a–b. A front pulley 24a–b mechanically engaged to the respective corrugated belt 30a–b is then rotated. A front sprocket 28a–b attached to the respective front pulley 24 drives a front chain 23a–b which is mechanically connected to a front shaft 54a–b.

Figure 4:
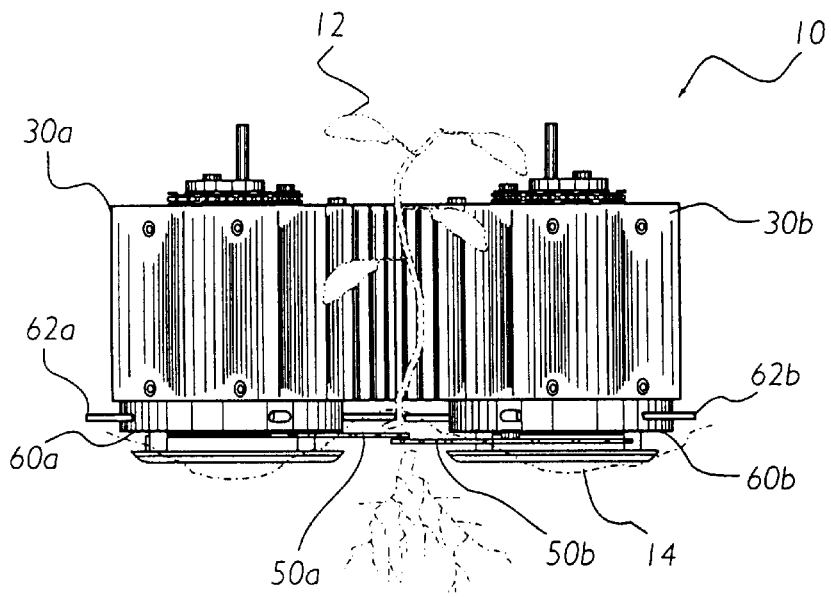
FIG. 4 is a front view of the present invention harvesting a row of beans.

As best shown in FIG. 5 of the drawings, the front shaft 54a–b rotatably projects through the respective frame 20a–b where it secures a respective cutting disc 50a–b. The pair of cutting discs 50a–b are substantially parallel to one another and overlap as best shown in FIG. 4 of the drawings. The cutting discs 50a–b are driven counter to one another for severing the row crop 12. The opposing surfaces of the cutting discs 50a–b are juxtaposed to each other for allowing self sharpening of the cutting discs 50a–b when in use. The cutting discs 50a–b are preferably parallel to the frames 20a–b so as to provide an uninterrupted feeding of the row crop 12 between the corrugated belts 30a–b. The cutting discs 50a–b have a plurality of arcuate notches 52 for preventing lodging of debris therebetween. The arcuate notches 52 on the respective cutting disc 50a–b are in a mirrored relationship for providing optimum performance as best shown in FIG. 2 of the drawings. Further, the cutting discs 50a–b are preferably rotated at different rotational speeds for increasing their cutting abilities. The various rotational speeds are achieved by utilizing different diameter front sprockets 28a–b. The differential rotational speed ranges between 1.2 to 2.9 times.

As best shown in FIGS. 1, 4 and 5 of the drawings, a pair of capturing discs 60a–b are attached to a lower portion of the front pulleys 24a–b. The capturing discs 60a–b include a plurality of resilient tines 62 which flex when in engagement with an object. The resilient tines 62 capture any bent row crop 12 and elevates it between the corrugated belts 30a–b. The capturing discs 60a–b are driven counter to one another.

As best shown in FIGS. 4 and 5, the pair of hubs 70a–b are attached coaxially to the capturing discs 60a–b opposite of the front pulley 24a–b. The hubs 70a–b rotate along with the capturing discs 60a–b for deflecting accumulated dirt when the invention is moved forward. The hubs 70a–b engage the ground surface 14 surrounding the row crop 12 thereby maintaining a constant depth of the cutting discs 50a–b penetration into the ground. The hubs 70a–b support the front portion of the frames 20a–b which are pivotally attached to the combine by the unnumbered attaching means. The hubs 70a–b are adjustably to allow the user to select various depths which the cutting discs 50a–b penetrate the ground.

In use, the hydraulic motor 40 is connected to the hydraulic system of the combine. The hubs 70a–b are adjusted to the desired depth control. The hydraulic motor 40 rotates the corrugated belts 30a–b which rotate the cutting discs 50a–b, the capturing discs 60a–b and the hubs 70a–b. The capturing discs 60a–b elevate the bent over portions of the row crop 12 and manipulate the row crop 12 toward the unnumbered slot. The hubs 70a–b maintain the desired depth of penetration by the cutting discs 50a–b and dispense with any accumulated dirt in front of them from their rotation. The cutting discs 50a–b penetrate the ground to a desired depth thereby severing the row crop 12 at its roots as best shown in FIG. 4. The severed row crop 12 is simultaneously engaged between the opposing corrugated belts 30a–b where after the severed row crop 12 is transported toward the rear portion of the frames 20a–b. The dirt and debris elevated by the cutting discs 50a–b is dropped out through the open portion behind the cutting discs 50a–b back unto the field so as to not go into the combine. The severed row crop 12 is thereafter deposited from the rear portion of the frames 20a–b into the auger of the combine where the seed is separated from the stalks and stems. This one step process of harvesting a row crop, especially edible beans, eliminates the four step process of cutting the bean plants, rod weeding the plants, then raking the beans and then finally combining the bean plants.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A row crop header for severing a row crop beneath a ground surface, comprising:
    at least one pair of frames each having a front portion and a rear portion, wherein said rear portions are attached to one another and define a slot there between, wherein each said rear portion of said pair of frames are pivotally attachable to a front of a conventional combine;
    an elevating means attached to each said front portion of said pair of frames for supporting said front portion of said pair of frames;
    a conveying means attached about each said pair of frames with said slot there between for transporting said row crop into said front of said conventional combine;
    a cutting means attached adjacent said front portion of said pair of frames, wherein said cutting means penetrates said ground surface at a desired depth to severe the roots of said row crop;
    wherein said cutting means comprises a pair of cutting discs rotating counter to one another and overlapping one another at a cutting section; and
    said cutting section has a front portion and a rear portion, wherein said front portion of said cutting section is positionable beneath said ground surface for severing said row crop beneath said ground surface.

2. The row crop header of claim 1 wherein said pair of cutting discs rotate at different rotational speeds for increasing cutting action.

3. The row crop header of claim 2, wherein said pair of cutting discs include a plurality of notches for engaging said row crop and for preventing lodging of solid debris.

4. The row crop header of claim 1, wherein said elevating means comprises a pair of hubs rotatably driven for preventing accumulation of dirt in front of said pair of hubs.

5. The row crop header of claim 1, including:
    a gathering means attached to each said front portion of said pair of frames for elevating bent over portions of said row crop and forcing said row crop toward said slot; and
    wherein said gathering means comprises a pair of capturing discs having a plurality of tines.

6. The row crop header of claim 5, wherein said tines are constructed from a resilient material for preventing breaking of said tines.

7. A row crop header for severing a row crop beneath a ground surface, specifically edible beans, comprising:
    at least one pair of frames each having a front portion and a rear portion, wherein said pair of frames are attached to one another and define a slot there between, wherein each said rear portion of said pair of frames are pivotally attachable to a front of a conventional combine;
    an elevating means attached to each said front portion of said pair of frames for supporting said front portion of said pair of frames;
    a conveying means attached about each said pair of frames with said slot there between for transporting said row crop into said front of said conventional combine;
    a cutting means attached adjacent said front portion of said pair of frames, wherein said cutting means penetrates said ground surface at a desired depth to severe the roots of said row crop;
    wherein said cutting means comprises a pair of cutting discs rotating counter to one another and overlapping one another at a cutting section; and
    said cutting section has a front portion and a rear portion, wherein said front portion of said cutting section is positionable beneath said ground surface for severing said row crop beneath said ground surface; and
    wherein said pair of cutting discs are at an angle with respect to said ground surface.

8. The row crop header of claim 7, wherein said pair of cutting discs rotate at different rotational speeds for increasing cutting action.

9. The row crop header of claim 8, wherein said pair of cutting discs include a plurality of notches for engaging said row crop and for preventing lodging of solid debris.

10. The row crop header of claim 7, wherein said elevating means comprises a pair of hubs rotatably driven for preventing accumulation of dirt in front of said pair of hubs.

11. The row crop header of claim 7, including:
    a gathering means attached to each said front portion of said pair of frames for elevating bent over portions of said row crop and forcing said row crop toward said slot; and
    wherein said gathering means comprises a pair of capturing discs having a plurality of tines.

12. A row crop header for severing a row crop beneath a ground surface, specifically edible beans, comprising:
    at least one pair of frames each having a front portion and a rear portion, wherein said pair of frames are attached to one another and define a slot there between, wherein each said rear portion of said pair of frames are attachable to a front of a conventional combine;
    a conveying means attached about each said pair of frames with said slot there between for transporting said row crop into said front of said conventional combine;
    a pair of cutting discs rotatably connected to said at least one pair of frames and rotating counter to one another and overlapping one another at a cutting section;
    said cutting section has a front portion and a rear portion, wherein at least said front portion of said cutting section is positionable beneath said ground surface for severing said row crop beneath said ground surface; and
    wherein said pair of cutting discs are each flat and are at an angle with respect to said ground surface.

13. The row crop header of claim 12, wherein said pair of cutting discs rotate at different rotational speeds for increasing cutting action.

14. The row crop header of claim 12, wherein said pair of cutting discs include a plurality of notches for engaging said row crop and for preventing lodging of solid debris.

15. The row crop header of claim 12, wherein said elevating means comprises a pair of hubs rotatably driven for preventing accumulation of dirt in front of said pair of hubs.

16. The row crop header of claim 12, including:
a gathering means attached to each said front portion of said pair of frames for elevating bent over portions of said row crop and forcing said row crop toward said slot; and
wherein said gathering means comprises a pair of capturing discs having a plurality of tines.

* * * * *